Feb. 23, 1926.
O. C. WHITE
EYE SHADE
Original Filed Oct. 10, 1922
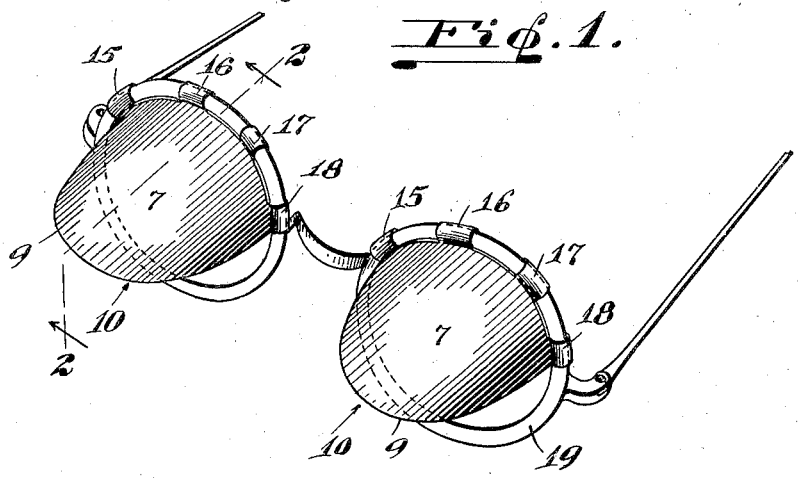
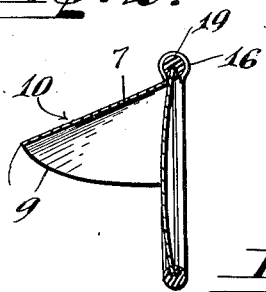
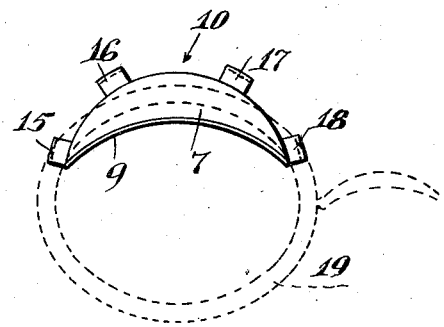
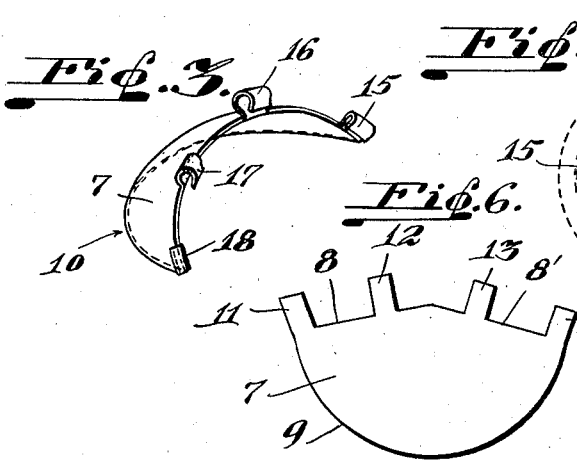
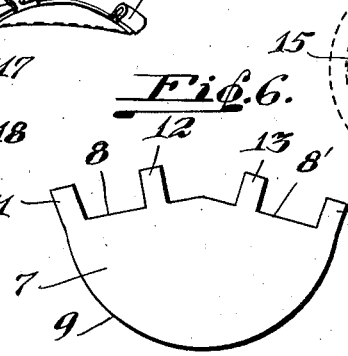
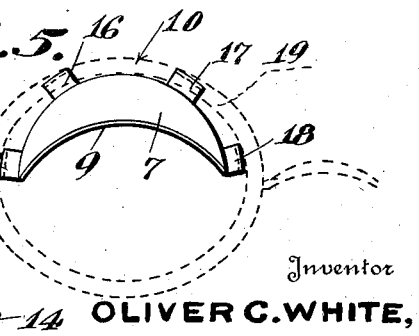
Inventor
OLIVER C. WHITE,
BY
*R. S. Berry*
Attorney Patented Feb. 23, 1926.

1,574,144

UNITED STATES PATENT OFFICE.

OLIVER C. WHITE, OF GARDENA, CALIFORNIA.

EYE SHADE.

Application filed October 10, 1922, Serial No. 593,526. Renewed January 16, 1926.

*To all whom it may concern:*

Be it known that I, OLIVER C. WHITE, a citizen of the United States, residing at Gardena, in the county of Los Angeles and State of California, have invented new and useful Improvements in Eye Shades, of which the following is a specification.

My invention relates to an eye shade attachment for eye glasses or eye glass frames. An object of my invention is to provide an eye shade attachment for eye glasses adapted to be readily applied to and removed from eye glasses or eye glass rims. Another object is to provide means for effecting detachable engagement between the shade attachment and the curved margins of eye glasses or rims of various sizes and shapes.

With the foregoing objects in view together with such other objects and advantages as may subsequently appear my invention consists of the construction hereinafter described and claimed and illustrated in the accompanying drawing, in which:

Figure 1 is a view in perspective of the invention as applied.

Fig. 2 is a view in vertical cross sectional detail as seen on the line 2—2 of Fig. 1.

Fig. 3 is a view in rear perspective of one eye shade.

Figs. 4 and 5 are diagrammatic views illustrating the manner of applying the shades to an eye glass frame.

Fig. 6 is a plan view of the blank as struck from a sheet of material preparatory to forming the shade.

Fig. 7 is a view in rear elevation of a modified form of the shade.

In carrying out my invention a blank 7 is formed of sheet material such as celluloid, or the like, which blank is formed with an inner edge comprising oppositely inclined margins 8 and 8' leading from a central point and having an outer arcuate edge 9 struck from the point of intersection of the margins 8—8'; the blank being curved longitudinally so that its rear edge will extend substantially on a semicircle with the margins 8 and 8' on a plane with each other so that the shade may be positioned with its inner edge in contact with an eyeglass or an eyeglass frame, and when so applied form the upper arched portion 10 of the shade on an incline as particularly shown in Figure 2. As a means for affording detachable connection between the shade and the eyeglass or eyeglass frame the inner edge of the blank is formed with integral tangs 11, 12, 13 and 14, as shown in Fig. 6, which are bent upwardly and thence downwardly to form hooks 15, 16, 17 and 18 along the inner edge of the shade; the hooks 15 and 18 being disposed at the ends of the shade and the hooks 16 and 17 spaced apart intermediate the hooks 15 and 18. These hooks are adapted to extend over and engage an eyeglass rim 19, as shown in Figures 1 and 2, or may be engaged to the edge of an eyeglass not fitted with a frame. Any suitable number of the hooks may be employed as occasion may require.

As a means for adapting the shade to fit frames or lenses of various marginal curvatures and sizes, the shade is formed with the longitudinal curvature slightly less than that of the upper margin of an ordinary eyeglass lens or frame, so that when applying the shade the latter will be slightly spread under tension; the material of which the shade is formed being resilient so that the body of the shade and the hooks will have a spring action.

In the operation of the invention the shade is applied either by first engaging the end hooks with the eyeglass and then pressing the intermediate hooks in engagement therewith as illustrated in Fig. 4, or by first engaging the intermediate hooks with the eyeglass and then spreading the shade to bring the end hooks in engagement therewith as shown in Fig. 5. The body of the shade and the hooks being resilient a clamping engagement with the eyeglass will be effected; the pull exerted by the spread of the shade co-operating with the clamping action of the hooks to securely retain the shade in position.

The shade thus constructed is adapted to be applied to an eyeglass frame whether the latter be fitted with lenses or not and may also be applied to the rimless type of eyeglass, the essential feature residing in providing a shade or visor with means whereby it may be readily engaged with an arcuate or curved marginal support.

If desired, the engaging hooks may be formed by providing the inner edge of the shield with a continuous arcuate flange as indicated at 20 in Figure 7, which flange may be formed with kerfs 21 where it is desired to increase its longitudinal flexibility. However, where the shade is constructed to fit an eyeglass or rim of a certain size the kerfs 21 may be dispensed with.

I claim:

In an eye shade, a support having a curved upper edge, a visor formed of resilient sheet material having an inner edge formed on a curvature less than that of the margin of said support, and integral hooks on the inner edge of said visor engageable with the margin of said support on spreading said visor; said hooks adapted to clamp on said support and said visor exerting a pull on said hooks.

OLIVER C. WHITE.